(12) United States Patent
Neugebauer

(10) Patent No.: US 12,459,745 B2
(45) Date of Patent: Nov. 4, 2025

(54) LOADING STATION FOR AN OVERHEAD CONVEYOR WITH TRANSPORT POUCHES FOR CONVEYED GOODS

(71) Applicant: BEUMER GROUP GMBH & CO. KG, Beckum (DE)

(72) Inventor: Jürgen Neugebauer, Semriach (AT)

(73) Assignee: BEUMER GROUP GMBH & CO. KG, Beckum (DE)

( * ) Notice: Subject to any disclaimer, the term of this patent is extended or adjusted under 35 U.S.C. 154(b) by 154 days.

(21) Appl. No.: 18/286,822

(22) PCT Filed: Apr. 14, 2022

(86) PCT No.: PCT/DE2022/100290
§ 371 (c)(1),
(2) Date: Oct. 13, 2023

(87) PCT Pub. No.: WO2022/218480
PCT Pub. Date: Oct. 20, 2022

(65) Prior Publication Data
US 2024/0124240 A1   Apr. 18, 2024

(30) Foreign Application Priority Data
Apr. 16, 2021  (EP) ..................................... 21168934

(51) Int. Cl.
*B65G 17/20*  (2006.01)
*B65G 47/04*  (2006.01)

(52) U.S. Cl.
CPC ............. *B65G 17/20* (2013.01); *B65G 47/04* (2013.01)

(58) Field of Classification Search
None
See application file for complete search history.

(56) References Cited

U.S. PATENT DOCUMENTS 10,322,887 B2 *  6/2019  Fenile .................... B65G 47/36
10,737,889 B2 *  8/2020  Eisenberg ............... B65B 43/30
(Continued)

FOREIGN PATENT DOCUMENTS

| CH | 713399 A1 | 7/2018 |
| DE | 102019205980 A1 * | 10/2020 |
| EP | 2418160 A1 | 2/2012 |

OTHER PUBLICATIONS

International Search Report (English and German) and Written Opinion of the ISA (German) issued in PCT/DE2022/100290, mailed Jul. 1, 2022; ISA/EP.

*Primary Examiner* — Kavel Singh
(74) *Attorney, Agent, or Firm* — Harness, Dickey & Pierce, P.L.C.

(57) ABSTRACT

The invention relates to an overhead conveyor with transport pouches for conveyed goods, wherein the transport pouches are rotatable relative to the carrier, wherein the overhead conveyor furthermore has a loading station with a guide rail arranged below the running profile. The transport pouches, before reaching the guide rail, assume a second orientation rotated with respect to the first orientation. The guide rail has a guide edge which, when the transport pouch reaches the guide rail, is brought into contact with the region of the holding bracket located between the bag and a carrying hook. The guide edge has a first section which crosses the conveying plane, so that the transport pouch, when passing the first section, is moved away from the conveying plane relative to the carrier, wherein the guide edge serves as a support via which the loading opening, when passing the first section, is levered open such that the bag is clamped and the transport pouch can be loaded. The invention furthermore relates to a corresponding method.

22 Claims, 6 Drawing Sheets

(56) References Cited

U.S. PATENT DOCUMENTS

| | | | |
|---|---|---|---|
| 10,954,079 B2 * | 3/2021 | Ramseier | B65G 47/61 |
| 11,084,657 B2 * | 8/2021 | Herzog-Lang | B65G 47/61 |
| 11,084,658 B2 * | 8/2021 | Stauber | B65G 17/485 |
| 11,434,084 B2 * | 9/2022 | Ramseier | B65G 47/61 |
| 2012/0037272 A1 | 2/2012 | Wend et al. | |
| 2021/0395017 A1 | 12/2021 | Stauber | |

* cited by examiner

LOADING STATION FOR AN OVERHEAD CONVEYOR WITH TRANSPORT POUCHES FOR CONVEYED GOODS

CROSS-REFERENCE TO RELATED APPLICATIONS

This application is a U.S. National Phase application under 35 U.S.C. 371 of International Application No. PCT/DE2022/100290, filed on Apr. 14, 2022, which claims the benefit of European Patent Application No. 21168934.4, filed on Apr. 16, 2021. The entire disclosures of the above applications are incorporated herein by reference.

BACKGROUND

This section provides background information related to the present disclosure which is not necessarily prior art.

TECHNICAL FIELD AND DISCUSSION

The invention is based on an overhead conveyor with transport pouches for conveyed goods, with a running profile for carriers of the overhead conveyor which are movable in a conveying direction and which have a carrying hook for attaching one transport pouch each, wherein each transport pouch has a bag for receiving conveyed goods and a holding bracket fastened to the upper side of the bag, wherein the transport pouch is rotatable relative to the carrier, wherein the holding bracket bounds a loading opening of the transport pouch, and wherein the holding bracket has, in a region between the bag and the carrying hook, at least in sections, a region which projects laterally out of a vertical conveying plane which extends in the conveying direction and in which the carrying hook lies, wherein the overhead conveyor comprises a loading station which has a guide rail arranged below the running profile, wherein the transport pouch, before reaching the loading station, has a first orientation transversely with respect to the conveying direction, in which the loading opening faces the bag rear wall, and wherein the transport pouch, before reaching the guide rail, assumes a second orientation rotated with respect to the first orientation. The invention furthermore relates to a method for transferring a transport pouch into a loading position. An overhead conveyor is known from DE 10 2019 205 980 A1.

A further overhead conveyor is known from EP 2 418 160 B1, the transport pouches of which are likewise brought into a loading or unloading position for loading or unloading, but the overhead conveyor requires an additional pressure piece in order to be rotated and opened in interaction with a runner arranged parallel to and at a distance from the conveying plane. The device of EP 2 418 160 B1 therefore has the disadvantage that it is structurally complex and the pouches are opened only inadequately for the loading operation.

SUMMARY

This section provides a general summary of the disclosure and is not a comprehensive disclosure of its full scope or all of its features.

It is therefore one aspect of the invention to improve an overhead conveyor with transport pouches for conveyed goods in such a way that its structural complexity is lower and the loading of transport pouches is improved.

Accordingly, it is provided that the guide rail has a guide edge which, when the guide rail is reached by the transport pouch, is brought into contact with that region of the holding bracket which is located between the pouch and the carrying hook, wherein the guide edge has at least one first section which crosses a vertical conveying plane below the running profile, so that a transport pouch is moved away from the conveying plane relative to the carrier when passing the first section, wherein the guide edge serves as a support via which the loading opening is levered open when passing the first section in such a way that the loading opening is arranged at a distance from the pouch rear wall and the pouch is clamped, so that the transport pouch can be loaded. A prestress between the carrying hook and the holding bracket can arise in particular in that the holding bracket, for rotation with respect to the carrying hook, has to overcome a gradient of a lower carrying hook section, which can only be achieved by overcoming the weight of the transport pouch.

Preferably, the loading opening can have a substantially rectangular cross section, wherein at least one bag front side and one bag rear side are fastened to the holding bracket by means of a seam. The holding bracket thus has three different sections. The first section surrounds the loading opening, the second or middle section provides the connecting piece between the loading opening and the carrying hook, wherein the third section is suspended in the carrying hook and can have an eye for suspension in the carrying hook. The region projecting laterally out of the conveying plane can be implemented by a greater width of the holding bracket with respect to the carrying hook. This region can provide a contact surface of the holding bracket for contact with the guide rail, which prevents vertical rotation of the transport pouch when the latter is guided along the guide rail by means of the holding bracket. The greater width of the holding bracket can extend, for example, symmetrically with respect to the conveying plane. Alternatively, the holding bracket can have a lateral projection on one side, by means of which torsion of the transport pouch about a vertical axis is prevented by contact of the lateral projection of the guide rail.

The loading station can be a manual or automatic workstation for loading the transport pouches, wherein the running profile of the overhead conveyor is guided through the loading station. In the case of automatic loading, provision can be made for a conveying belt to convey the articles to the loading station. It has an entry side, through which the transport pouches can move into the loading station, and an exit side opposite the entry side, through which the transport pouches can leave the loading station. Between the entry side and the exit side, the loading station has a loading position, in which the transport pouches are stopped for loading. In the loading position, the loading station has a loading trough, through which the loading opening of the transport pouches is accessible from outside the loading station. Arranged around the loading trough is a work surface, on which the handling of articles which are loaded into the transport pouches can take place. Provision can be made for the height of the work surface to be adjustable, for example electrically or manually, in order to allow ergonomic work.

The guide edge according to the invention, which crosses the conveying plane and thus the vertical plane below the carrying hook in the conveying direction, ensures that the holding bracket comes into contact with the guide edge after the transfer of the transport pouch into the second orientation independently of its configuration. Furthermore, there is the possibility of successively building up the lever action for opening or lifting the loading opening, so that no pulse-like loading of the transport pouches occurs. Depending on the angle at which the guide rail crosses the conveying plane, it can be determined how long the entry region until the loading position is, or how great the pulse-like loading on the transport pouches is. In the loading position, the loading opening of the transport pouch can point in particular in the same direction in which the guide rail crosses the conveying plane in the conveying direction.

It can be provided that the guide edge has a second section adjoining the first section, which extends substantially parallel to the conveying direction and has a substantially constant offset to the conveying plane. In the region of the loading position, it is advantageous to provide, at least in sections, a region with a constant offset to the conveying plane, so that optimum opening of the transport pouch is also achieved beyond the exact loading position.

It can be provided that the guide edge has a third section adjoining the first or second section, which crosses the conveying plane in the opposite direction to the course of the first section, so that a transport pocket is transferred back from the second into the first orientation when passing the third section by releasing the pretension between carrying hook and retaining bracket. Similarly to the first section crossing the conveying plane, the third section also permits controlled turning back of the transport pouches into their starting position, which transport pouches now have greater inertia after filling or the pretension on the carrying hook has increased as a result of the filling.

It can be provided that the retaining bracket has an approximately Z-shaped course, wherein the maximum offset between conveying plane and first section of the guide edge is selected such that the middle retaining bracket section bears approximately vertically against the guide edge. At the same time, it can be provided that the upper retaining bracket section extends from the guide edge as far as the carrying hook and the lower retaining bracket section, which surrounds the loading opening, is now brought into a horizontal position. The upper retaining bracket section in this case constitutes a lever arm, the support of which is defined by the guide edge. As a result of the offset between conveying plane and guide edge, the carrying hook now exerts a compressive force on the lever arm or the upper retaining bracket section, so that the opposite lower retaining bracket section or the loading opening is correspondingly pivoted upward.

It can be provided that the overhead conveyor has a second guide rail with a second guide edge lying opposite the first guide edge, wherein the second guide edge and the first guide edge have a mutually complementary course in regions, such that an approximately equidistant guide gap is formed in this region between the two guide edges.

It can be provided that the guide rails have a region on the input side in which the guide gap tapers. As a result, pendulum movements of the transport pouch before reaching the loading position can be prevented at an early stage and the transport pouch can be brought to the predefined path.

It can be provided that the guide rails have a region on the output side in which the guide gap widens.

Furthermore, it can be provided that there is a vertical offset between the first and second guide rail, wherein the second guide rail is arranged below the first guide rail. As a result, it is achieved that the retaining bracket bears, on the one hand, against the first guide edge and, on the other hand, against the second guide edge and, as a result, pendulum movements and torsional movements of the transport pouch in the loading station are effectively prevented.

Furthermore, it can be provided that the loading station has, upstream of the first guide rail in conveying direction, a substantially vertical deflection plate which is positioned at the height of the bag obliquely with respect to the conveying direction and which is designed to transfer the transport pouch from the first into the second orientation when the bag is guided past the deflection plate. The deflection plate can extend over at least one third of the transport pouch height. The deflection plate can be arranged offset with respect to the conveying plane in conveying direction and can be oriented running toward the conveying plane in conveying direction. The deflection plate can comprise a lower deflection plate acting on the bag of the pouch and an upper deflection plate acting on the holding bracket section bounding the loading opening. The upper and the lower deflection plate can have different angles with respect to the conveying direction, such that the pouch first reaches the lower deflection plate and then the upper deflection plate or first reaches the upper deflection plate and then the lower deflection plate. In particular with increasing weight and greater overall height of the transport pouches, this type of pouch rotation has the advantage that torsion of the transport pouch per se is avoided on account of the deflection over virtually the entire pouch height and in particular at the height of the center of gravity of the pouch. As a result, pouch wear and pendulum movements can be avoided.

It can be provided that the deflection plate comprises an upper and a lower deflection plate, wherein the lower deflection plate is arranged such that, when the transport pouch is guided past the deflection plate, the lower deflection plate comes into contact with the bag, and wherein the upper deflection plate is arranged such that, when the transport pouch is guided past the deflection plate, the upper deflection plate comes into contact with the section of the holding bracket bounding the loading opening.

Furthermore, it can be provided that the lower and the upper deflection plate are arranged such that, when the transport pouch is conveyed past the deflection plate, the lower deflection plate comes into contact with the transport pouch before the upper deflection plate.

It can furthermore be provided that the transport pouch in the second orientation has an angle of 30-80 degrees, preferably 60-70 degrees, with respect to the conveying direction. As a result, the loading opening of the transport pouch does not assume a position transverse to the conveying direction X. This has the advantage that the pouches have to be pivoted less far and the residence time of the pouches in the loading station is minimized. Furthermore, the loading station can thereby be of more compact design.

Furthermore, it can be provided that the transport pouch is rotated relative to the carrier by rotating the carrying hook relative to the carrier. If the carrying hook is designed to be rotatable with respect to the carrier, the transport pouch does not assume a rotated orientation relative to the carrying hook. In this way, the rotation can be produced without generating a prestress. As a result, the transport pouches can be rotated more easily. Furthermore, there is less wear between carrying hook and holding bracket compared to a solution in which they are rotated relative to one another.

The invention furthermore relates to a method for transferring a transport pouch into a loading position by means of an overhead conveyor including:
   conveying a transport pouch for conveying conveyed goods by means of a retaining bracket suspended on a carrying hook of a carrier along a running profile extending in the conveying direction in an orientation transverse to a conveying plane;

transferring the transport pouch into a second orientation, wherein the transport pouch is arranged in the second orientation rotated in the direction of the conveying plane with respect to the first orientation;

guiding the retaining bracket past a guide rail crossing the conveying plane when the transport pouch, for example in the second orientation, is moved along the running profile, as a result of which the transport pouch is moved away from the conveying plane relative to the carrier, on the one hand, and the retaining bracket is rotated about a horizontal axis, on the other hand, so that a loading opening of the transport pouch is opened for loading the transport pouch.

Furthermore, a separating device can be provided upstream of the guide rail, by means of which transport pouches can be fed separately to the guide rail.

Furthermore, the guide rail can have a section crossing the conveying plane in the opposite direction in its further course downstream of the loading position, so that the transport pouch returns into its starting position when the transport pouch is guided past this section.

Furthermore, the transfer of the transport pouch from the first into the second orientation can comprise guiding a bag arranged below the holding bracket of the transport pouch past a deflection plate which is arranged upstream of the guide rail and projects obliquely into the bag transport path and thereby brings about the vertical rotation of the transport pouch.

Furthermore, the transfer of the transport pouch from the first into the second orientation can comprise guiding the bag past a lower deflection plate and guiding the holding bracket section bounding the loading opening past an upper deflection plate.

Furthermore, the bag can be guided past the lower deflection plate before the holding bracket section bounding the loading opening is guided past the upper deflection plate.

Furthermore, the method can comprise stopping the transport pouch after reaching the loading position, and manually or automatically conveying the transport pouch further after stopping as soon as a loading state of the transport pouch has been detected.

Finally, provision can be made for the transport pouch, after returning into its starting position, to be conveyed over a slope section, the upper end of which is adjoined by a drive-free slope section, via which the filled transport pouches are fed back into a driven conveying section.

Furthermore, provision can be made for the transport pouch, during the transfer from the first into the second orientation, to be rotated by an angle of 30-80 degrees, preferably 60-70 degrees, with respect to the conveying direction.

Furthermore, the transfer of the transport pouch from the first into the second orientation can comprise rotating the carrying hook relative to the carrier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Further details of the invention are explained with reference to the following figures. In the figures.

DETAILED DESCRIPTION

Example embodiments will now be described more fully with reference to the accompanying drawings.

Figure 1:
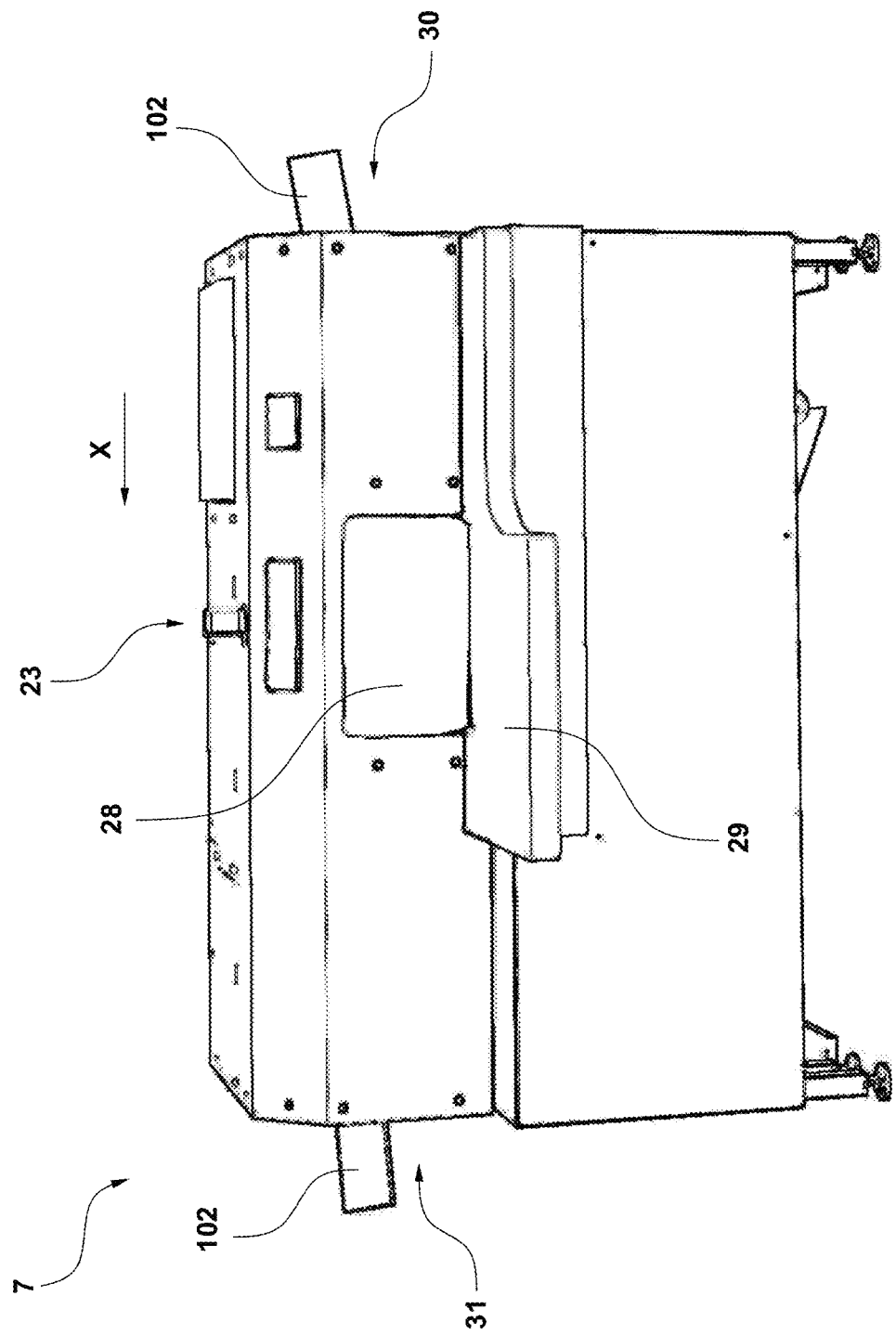
FIG. 1 shows a perspective view of an embodiment of a loading station.

FIG. 1 shows the side view of a loading station 7 according to the invention, through which the running profile 102 of an overhead conveyor 100 is guided in a conveying direction X. At an inlet 30 of the loading station 7, the running profile 102 has a slope 26. This serves to provide a stowage region, in which incoming transport pouches 1 can wait drive-free until a separating device 24 releases the access to the loading station 7 and the first of the waiting transport pouches can move into the loading station 7. At an outlet 31 of the loading station 7, a slope 26 is likewise provided, in which filled transport pouches 1 coming from the loading station can be fed to a subsequent conveying section. In the region of a loading position 23, in which the transport pouches 1 are stopped in the loading station 7, the transport pouches 1 are loaded via a loading trough 28, which is arranged above the loading opening 6 of a waiting transport pouch 1, so that articles with which the transport pouch is to be loaded fall through the loading trough 28 and then through the loading opening 6 into the bags 4 of the transport pouches. The transport pouches 1 are fed to the loading station 7 in a first orientation 11 transversely with respect to the conveying direction X, since this means that the overhead conveyor 100 is used as efficiently as possible. Preferably, the loading opening of the pouches 6 points counter to the conveying direction X. In the loading station 7, the transport pouches 1 are transferred by means of deflection devices from the first orientation 11 into a second orientation 12, in which the transport pouches are rotated by 90° about their vertical axis with respect to the first orientation 11, so that the loading opening 6 points in the direction of the loading trough 28. In this case, a prestress can be built up between the transport pouch 1 and the suspension device 3 of the carrier 2. Furthermore, the loading opening 6 is oriented substantially vertically in the first orientation 11, so that the transport pouches 1 lie largely flat and space-saving on one another. In the second orientation 12, the loading opening 6 is oriented substantially horizontally by the deflection devices, so that the transport pouches 1 are clamped and loadable. After leaving the loading position 23, the transport pouches 1 are transferred back into the starting position 11, for example by means of reducing the prestress and by corresponding configuration of the deflection devices.

Figure 2:
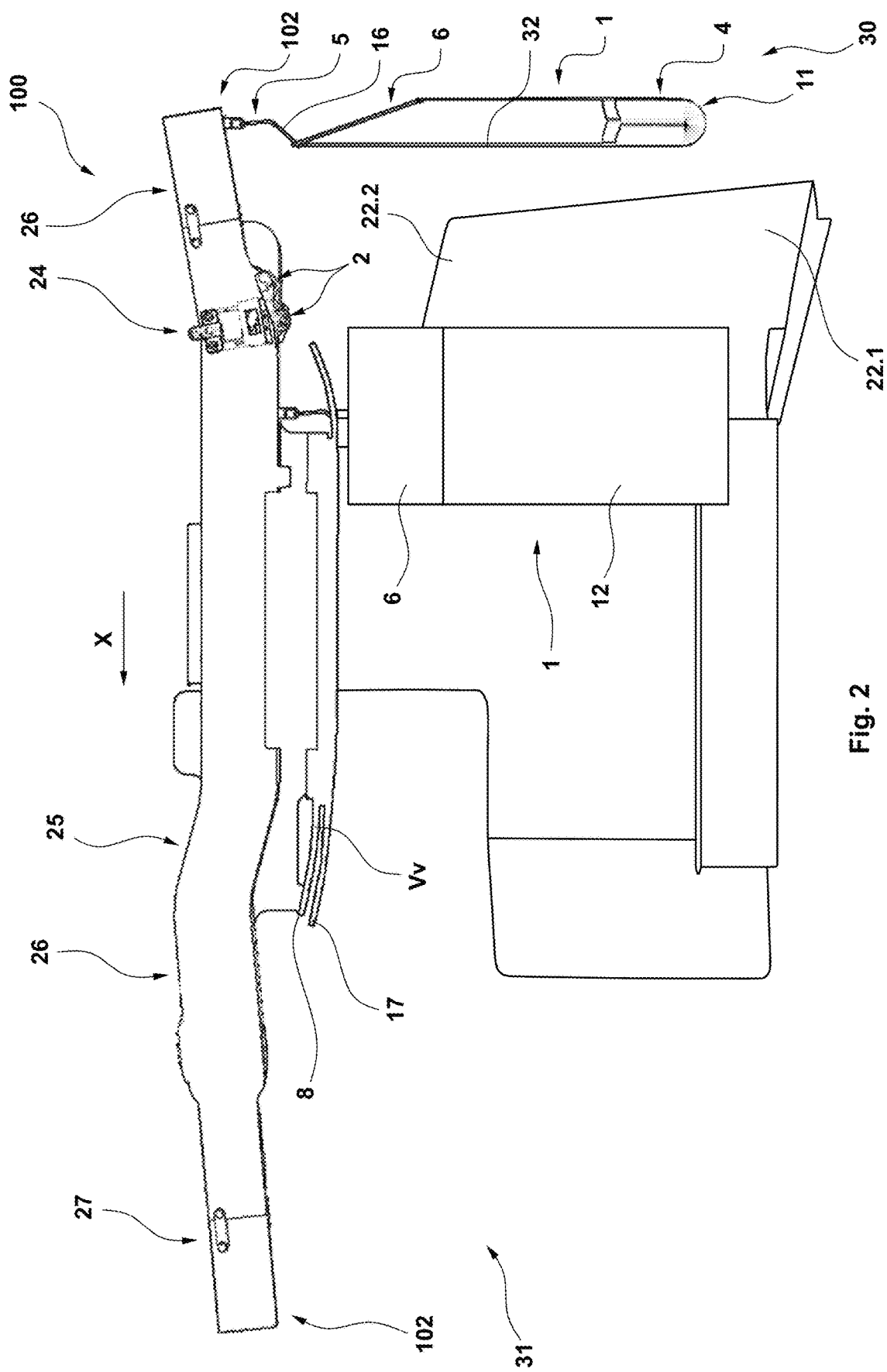
FIG. 2 shows a side view of an embodiment of the inner space of a loading station.

FIG. 2 shows a side view of the loading station 7 without the housing surrounding it. The course of the running profile 102 of the overhead conveyor 100 in the conveying direction X can be clearly seen. At the inlet 30 of the loading station 7, the running profile 102 has a slope 26, which is adjoined by a separating device 24. This selectively leaves the carrier 2 with transport pouches 1 suspended thereon via carrying hooks 3 onto the adjoining horizontal section of the running profile 102, in which the transfer from the first orientation 11 into the second orientation 12 and back takes place. In this horizontal region, a conveying means is provided, by means of which the pouches 1 are movable in and counter to the conveying direction X and can be stopped at predetermined locations, in particular in the loading position 23. The horizontal region is adjoined by a gradient, which is followed by a further slope 26. Via this slope, handled transport pouches 1 can again selectively leave the loading station 7 at their outlet 31 by means of a separating device 24 and be fed to the subsequent conveying section 27. The conveying plane E is defined by the perpendicular plane below the running profile 102 in conveying direction X. FIG. 2 shows by way of example a first transport pouch 1 suspended in the running profile 102 on a carrying hook 3 of a carrier 2, which, as shown, is still located in the first orientation perpendicular to the conveying plane E and is located shortly before the first separating device 24 and immediately before the deflection process from the first 11 into the second orientation 12. Clearly visible is the Z-shaped holding bracket 5, which has a lower section which bounds the loading opening 6, a middle region 16, which is angled at an angle between 45°-90° from the lower section, and an upper region, which has an eye for suspension in the carrying hook 3 and hangs down approximately perpendicularly in the first orientation. The transport pouch 1 has, in addition to the loading opening 6 pointing counter to the direction of travel X, a bag 4 for receiving articles to be transported, with a bag rear wall 32 pointing in the direction of travel X and a bag front wall pointing counter to the direction of travel X. The bag rear wall 32 is fastened to an upper end of the lower section of the holding bracket 5 or to the transition between the lower and middle holding bracket sections. The bag front wall is fastened to the lower end of the lower holding bracket section. In this orientation 11, the loading opening hangs down and the transport pouch is substantially flat. The loading station 7 has two guide rails 8, 17 arranged next to one another and substantially parallel to the conveying direction X, which form a guide gap 19 with guide edges 9, 18 facing one another. The second guide rail 17, which is arranged closer to the loading trough 28, is arranged below the first guide rail 8 by a vertical offset Vv. For transfer from the first into the second orientation 11, 12, the bag 4 of the transport pouch 1 is guided along a deflection plate 22.1, 22.2 arranged upstream of the guide rails 8, 17. The deflection plate 22.1, 22.2 has a lower deflection plate 22.1, which acts on the pouch 1 in the region of the bag 4, and an upper deflection plate 22.2, which acts on the pouch 1 in the region of the holding bracket section 5 bounding the loading opening 6. The deflection plates 22.1, 22.2 are arranged on the side of the conveying plane E opposite the loading trough 28 and run obliquely toward the conveying plane E with a slight angular offset with respect to one another in the conveying direction X, with the result that a transport pouch 1 conveyed along it experiences a vertical rotation in the clockwise direction over its entire height, with the result that the loading opening 6 rotates in the direction of the loading trough 28. A second transport pouch 1 shown is already located behind the deflection plates 22.1, 22.2 in the conveying direction X and has therefore already been transferred into the second orientation 12, in which the loading opening 6 of the transport pouch points in the direction of the loading trough 28 and the holding bracket is levered open by the guide rail 8, with the result that the border of the loading opening 6 is located in a substantially oblique to horizontal orientation. The guide rails have ends bent upward.

Figure 3:
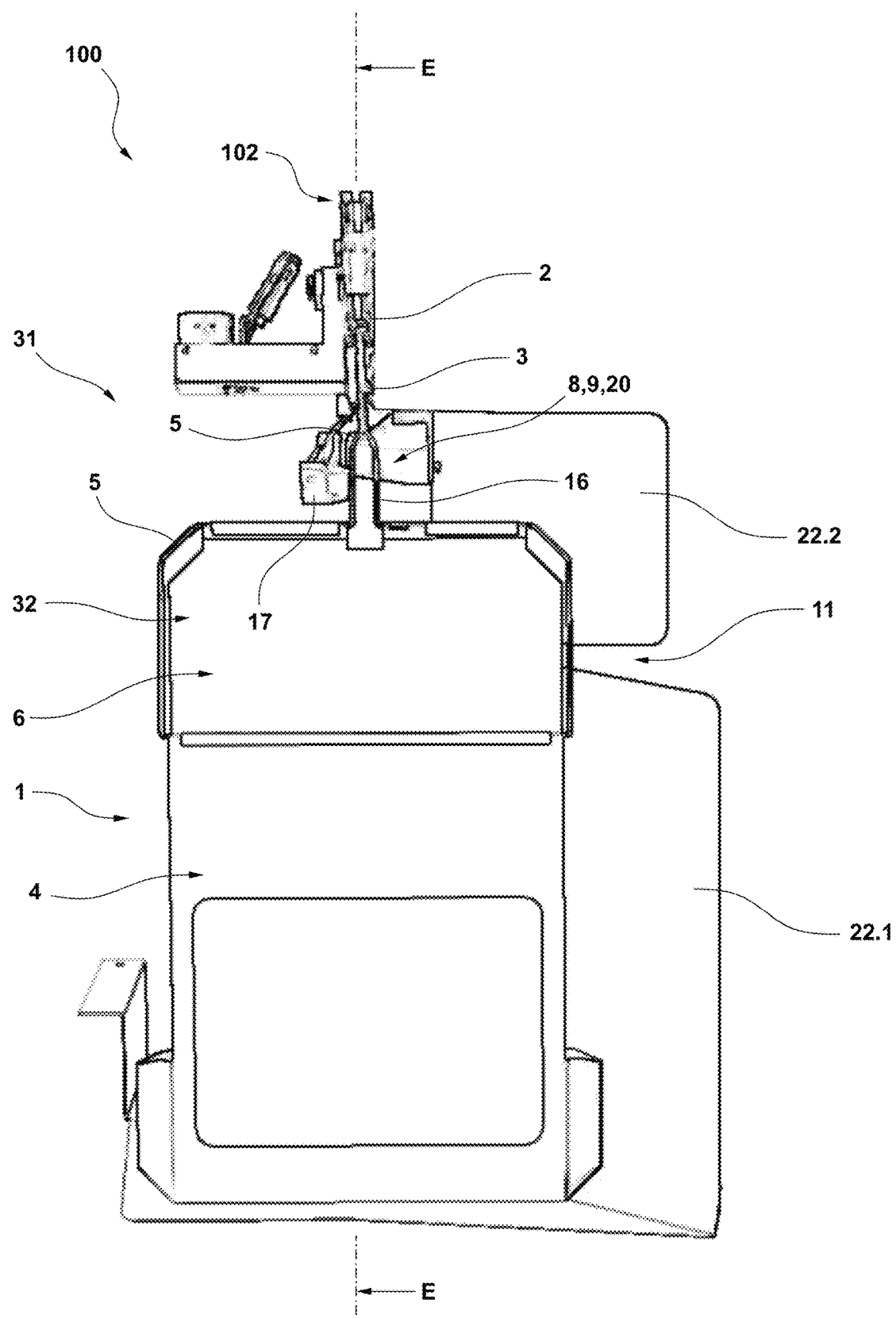
FIG. 3 shows a front view of the inner space on the input side of a loading station.

The conveying plane E is clearly shown in FIG. 3, which shows a view of the entry side 30 of the loading station 7 or a front view of the transport pouch 1 shown in FIG. 2. The lower section of the holding bracket 5 which bounds the loading opening 6 and is fastened, on the one hand, to the bag front wall and, on the other hand, to the bag rear wall 32 can be clearly seen. It can thereby be seen that the spacing of the bag front wall from the bag rear wall 32 can be varied via the orientation of the holding bracket 5, wherein the spacing is at a maximum in the horizontal orientation of the lower section of the holding bracket 5. The bag 4 can thereby be loaded best when the lower holding bracket section is in an orientation which is as horizontal as possible. The deflection plates 22.1, 22.2 are arranged so as to engage into the transport path laterally of the conveying plane E, so that, when the bag 4 is guided past the lower deflection plate 22.1 and the lower holding bracket section 5 past the upper deflection plate 22.2, a torque about the carrying hook 3 or about a vertical axis Av is generated. The guide edge 9 of the first guide rail 8 also engages into the transport path of the transport pouch coming from the same direction as the deflection plates 22.1, 22.2 and comes into contact with the central bracket section 16, which has a width B which is greater than the width b of the carrying hook, so that, by bringing the central holding bracket section 16 into contact with the guide edge 9, the loading opening 6 is successively levered open by means of the holding bracket 5 along the first guide rail section 8.

Figure 4:
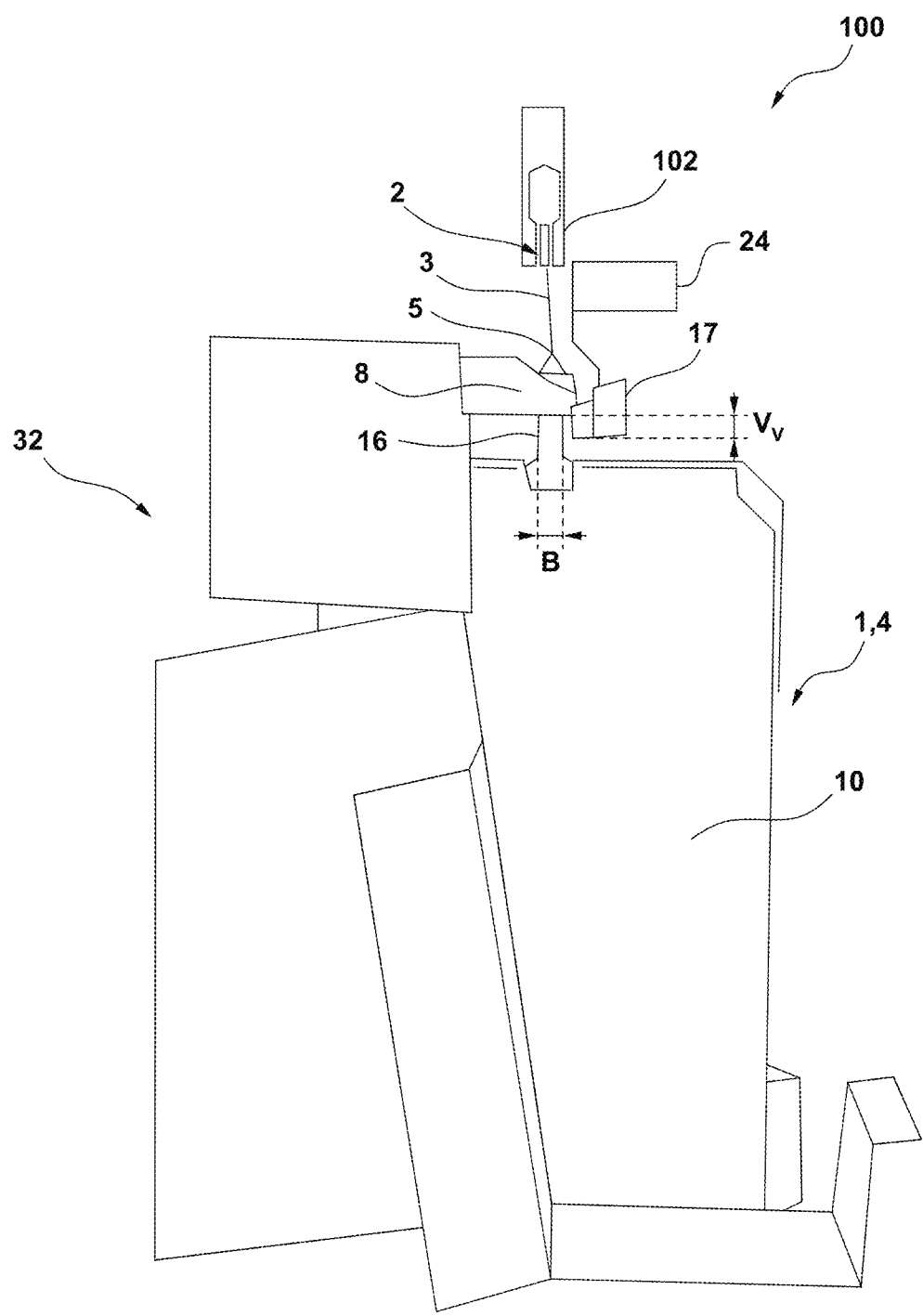
FIG. 4 shows a rear view of the inner space on the output side of a loading station.

FIG. 4 shows the view of the transport pouch 1 from the direction of the outlet 32 of the loading station 7. The vertical offset Vv between first guide rail 8 and second guide rail 17 and the central holding bracket section 16 running toward the first guide rail 8 with width B can be clearly seen. Furthermore, it becomes clear that the guide edge 9 of the first guide rail 8 is arranged outside the conveying plane E, so that the guide edge 9 both generates a lever action, by means of which the loading opening 6 is levered open in the direction of the loading trough 28.

Figure 5:
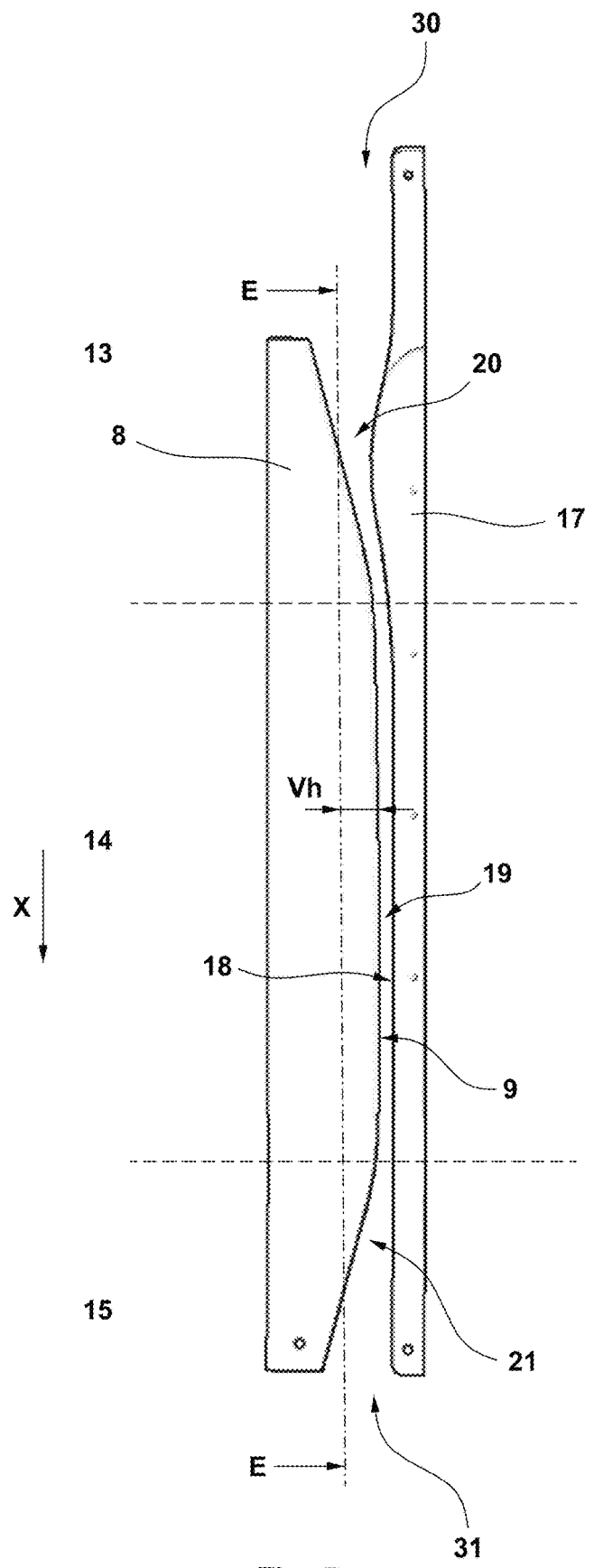
FIG. 5 shows a plan view of two guide rails of a loading station FIGS. 6a)-c) shows plan views of different embodiments of different angles of rotation in the second orientation of the transport pouch.
Figure 5:
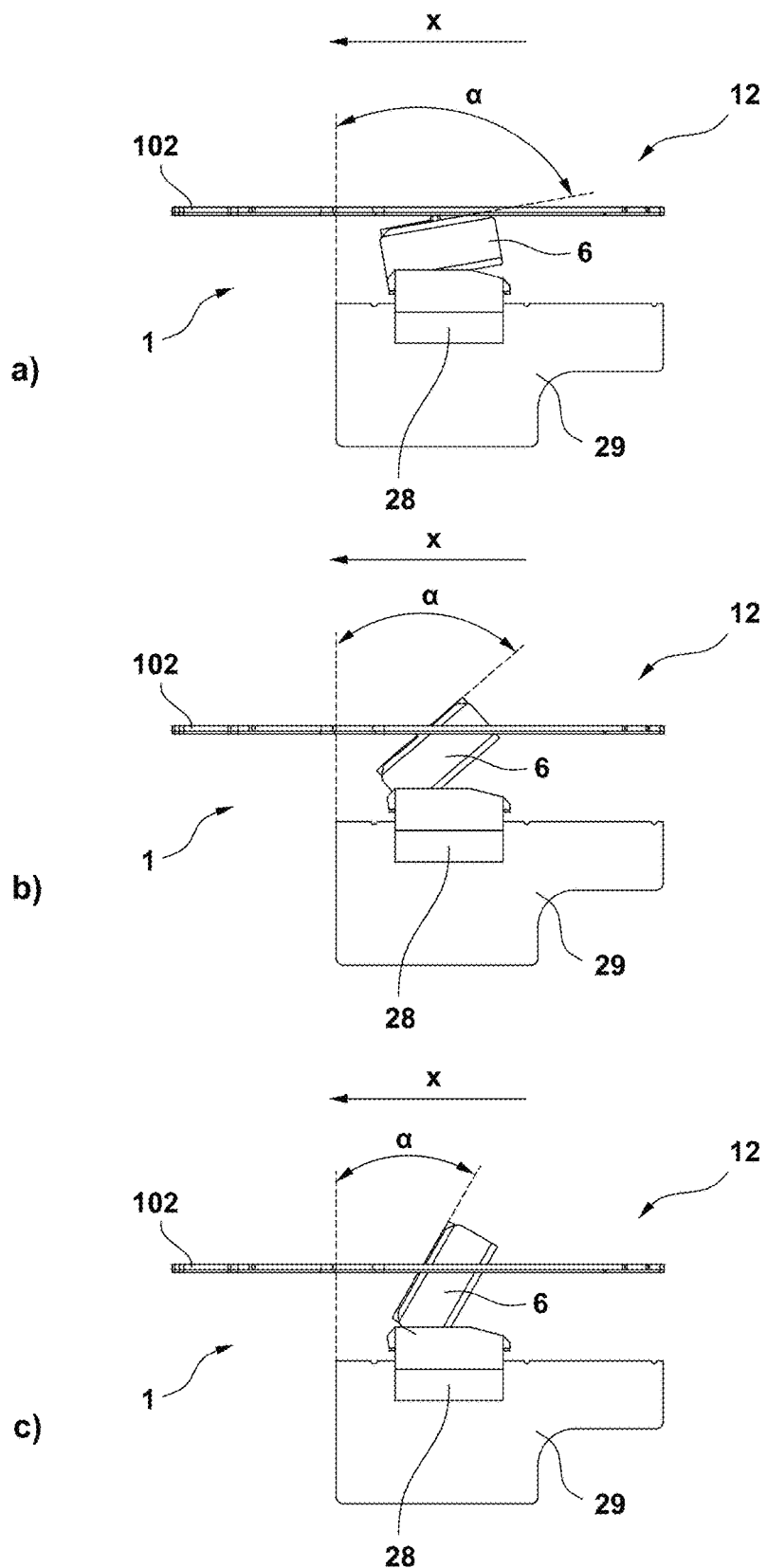

FIG. 5 shows a detailed view of the two guide rails 8, 17, wherein the conveying direction extends from top to bottom with respect to the illustration. The conveying plane E indicates the regular conveying plane of the transport pouches 1 if no guide rail 1 were present. The plane E is located below the running profile 102 or below the carrying hook 3, in which the transport pouch 1 is suspended. The first guide rail 8 has three sections. In a first section 13, the guide edge 9 of the first guide rail 8 crosses the conveying plane E. Along this section, the middle retaining bracket section 16, which is rotated into the second orientation 12 by means of the deflection plates 22.1, 22.2, comes into areal contact with the guide edge 9. In the course of passing the first guide edge section 14, the horizontal offset between guide edge 9 and conveying plane E increases increasingly up to a maximum offset Vh at the end of the first section 13. In the course of this, the holding bracket 5 fixed to the carrying hook 3 is deflected and levered around the guide edge 9, with the result that the lower retaining bracket section, which bounds the loading opening 6, is raised and is brought into a substantially horizontal orientation. The loading position 23 or the loading trough 28 of the loading station is located in the second section 14. The offset Vh is constant in this region. The transport pouch 1 is located in the second orientation 12 in the second region. In the third section 15, the guide rail 8 has an outlet zone in which the guide edge 9 again crosses the conveying plane E, this time in the opposite direction. As a result, and in conjunction with the release of the prestress between the carrying hook 3 and the holding bracket 5, the transport pouch is moved back into its initial orientation 11 in a flowing, non-abrupt transition. Arranged opposite the first guide rail 8 is a second guide rail 17 which, in the first section 13, forms with its guide edge 18 a tapering region 20 with the first guide edge 9 and then extends equidistantly to the latter, such that a guide gap 19 is formed between which the holding bracket 5 is guided through. The third region is adjoined by a widening zone 21 in which the horizontal spacing between the first and second guide edge 9, 18 increases again.

FIGS. 6a)-c) show different embodiments of angles of rotation a of the transport pouches 1 in the second orientation 12 with respect to the running profile 102 of the overhead conveyor 100. In this case, the loading opening 6 comes to a stop at different angles at the loading workstation, such that different loading widths for loading the pouches 1 can be provided with respect to the loading trough 28. In variants a) and b), the loading opening 6 of the transport pouch 1 has, for example, a greater usable loading width than if the pouch 1 were positioned parallel to the running profile 102 at the loading trough 28. As a result of the greater usable loading width, bulky articles, for example, can be loaded more easily into the transport pouch 1. For this purpose, the loading trough 28 can have a loading chute, the front edge of which facing the transport pouch 1 has a slope corresponding to the angle of rotation a, such that a secure transfer of the articles from the loading chute to the transport pouch is ensured. In the embodiment shown in FIG. 6a), the angle of rotation is 80 degrees, in the exemplary embodiment of FIG. 6b) 50 degrees. In the exemplary embodiment shown in FIG. 6c), the angle of rotation a has an absolute value of 30 degrees. Here, the usable loading width of the transport pouch 1 is smaller than the width of the loading opening 6. This embodiment can be used, for example, for smaller transport articles. Furthermore, there is the possibility of positioning two pouches 1 simultaneously next to one another on the loading trough, such that, if necessary, a manual sorting process can be carried out by an operator into the different pouches 1. In this exemplary embodiment, the loading chute can have a shape tapering in the direction of the transport pouch 1. All the exemplary embodiments in FIGS. 6a) to c) furthermore have the advantage that the pouches 1 do not have to be rotated completely by 90 degrees and thus the necessary rotation duration during the pivoting in and out of the second orientation 12 can be minimized.

The features of the invention disclosed in the above description, in the drawings and in the claims can be essential both individually and in any desired combination for the realization of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An overhead conveyor with transport pouches for conveyed goods, with a running profile for carriers of the overhead conveyor which are movable in a conveying direction and which have a carrying hook for attaching one transport pouch each, comprising:
   wherein each transport pouch has a bag for receiving conveyed goods and a holding bracket fastened to the upper side of the bag, wherein the transport pouch is rotatable relative to the carrier,
   wherein the holding bracket bounds a loading opening of the transport pouch,
   and wherein the holding bracket has, in a region between the bag and the carrying hook, at least in sections, a region which projects laterally out of a vertical conveying plane which extends in the conveying direction and in which the carrying hook lies,
   wherein the overhead conveyor comprises a loading station which has a guide rail arranged below the running profile,
   wherein the transport pouch, before reaching the loading station, has a first orientation transversely with respect to the conveying direction, in which the loading opening faces a bag rear wall, and
   wherein the transport pouch, before reaching the guide rail, assumes a second orientation rotated with respect to the first orientation,
   wherein the guide rail has a guide edge which, when the transport pouch reaches the guide rail, is brought into contact with the region of the holding bracket located between the bag and the carrying hook, wherein the guide edge has at least one first section which crosses the conveying plane, such that a transport pouch, when passing the first section, is moved away from the conveying plane relative to the carrier, wherein the guide edge serves as a support via which the loading opening, when passing the first section, is lifted such that the loading opening is arranged at a distance from the bag rear wall and the bag is clamped, such that the transport pouch can be loaded, and
   wherein the loading station has, upstream of the first guide rail in conveying direction, a substantially vertical deflection plate which is positioned at the height of the bag obliquely with respect to the conveying direction and which is designed to transfer the transport pouch from the first into the second orientation when the bag and/or the section of the holding bracket bounding the loading opening is guided past the deflection plate.

2. The overhead conveyor according to claim 1, wherein the guide edge has a second section adjoining the first section, which extends substantially parallel to the conveying direction and has a substantially constant offset to the conveying plane.

3. The overhead conveyor according to claim 1, wherein the guide edge has a third section adjoining the first or second section, which crosses the conveying plane in the opposite direction to the course of the first section, so that a transport pocket is transferred back from the second into the first orientation when passing the third section by releasing a pretension between carrying hook and retaining bracket.

4. The overhead conveyor according to claim 1, further comprising a retaining bracket having an approximately Z-shaped course, wherein the maximum offset between conveying plane and first section of the guide edge is selected such that the middle retaining bracket section bears approximately vertically against the guide edge.

5. The overhead conveyor according to claim 1, which has a second guide rail with a second guide edge lying opposite the first guide edge, wherein the second guide edge and the first guide edge have a mutually complementary course in regions, such that an approximately equidistant guide gap is formed in this region between the two guide edges.

6. The overhead conveyor according to claim 5, wherein the guide rails have a region on the input side in which the guide gap tapers.

7. The overhead conveyor according to claim 5, wherein the guide rails have a region on the output side in which the guide gap widens.

8. The overhead conveyor according to claim 5, wherein there is a vertical offset between the first and second guide rail, wherein the second guide rail is arranged below the first guide rail.

9. The overhead conveyor according to claim 1, wherein the deflection plate comprises an upper and a lower deflection plate, wherein the lower deflection plate is arranged such that, when the transport pouch is guided past the deflection plate, the lower deflection plate comes into contact with the bag, and wherein the upper deflection plate is arranged such that, when the transport pouch is guided past the deflection plate, the upper deflection plate comes into contact with the section of the holding bracket bounding the loading opening.

10. The overhead conveyor according to claim 9, wherein the lower and the upper deflection plate are arranged such that, when the transport pouch is conveyed past the deflection plate, the lower deflection plate comes into contact with the transport pouch before the upper deflection plate.

11. The overhead conveyor according to claim 1, wherein the transport pouch in the second orientation has an angle of 30-80 degrees, preferably 60-70 degrees, with respect to the conveying direction.

12. The overhead conveyor according to claim 1, wherein the transport pouch is rotated relative to the carrier by rotating the carrying hook relative to the carrier.

13. A method for transferring a transport pouch into a loading position by means of an overhead conveyor according to claim 1, comprising:
    conveying a transport pouch for conveying conveyed goods by means of a retaining bracket suspended on a carrying hook of a carrier along a running profile extending in the conveying direction in an orientation transverse to a conveying plane;
    transferring the transport pouch into a second orientation, wherein the transport pouch is arranged in the second orientation rotated in the direction of the conveying plane with respect to the first orientation;
    guiding the retaining bracket past a guide rail crossing the conveying plane when the transport pouch is moved along the running profile, as a result of which the transport pouch is moved away from the conveying plane relative to the carrier, on the one hand, and the retaining bracket is rotated about a horizontal axis, on the other hand, so that a loading opening of the transport pouch is opened for loading the transport pouch.

14. The method according to claim 13, wherein a separating device is provided upstream of the guide rail, by means of which transport pouches are fed separately to the guide rail.

15. The method according to claim 13, wherein the guide rail has a section crossing the conveying plane in the opposite direction in its further course downstream of the loading position, so that the transport pouch returns into its starting position when the transport pouch is guided past this section.

16. The method according to claim 13, wherein the transfer of the transport pouch from the first into the second orientation comprises guiding a bag arranged below the holding bracket of the transport pouch or a holding bracket section bounding the loading opening past a deflection plate which is arranged upstream of the guide rail and projects obliquely into the bag transport path and thereby brings about a vertical rotation of the transport pouch.

17. The method according to claim 16, wherein the transfer of the transport pouch from the first into the second orientation comprises guiding the bag past a lower deflection plate and guiding the holding bracket section bounding the loading opening past an upper deflection plate.

18. The method according to claim 17, wherein the bag is guided past the lower deflection plate before the holding bracket section bounding the loading opening is guided past the upper deflection plate.

19. The method according to claim 13, further comprising stopping the transport pouch after reaching the loading position, and manually or automatically conveying the transport pouch further after stopping as soon as a loading state of the transport pouch has been detected.

20. The method according to claim 13, wherein the transport pouch, after returning into its starting position, is conveyed over a slope section, the upper end of which is adjoined by a drive-free slope section, via which the filled transport pouches are fed back into a driven conveying section.

21. The method according to claim 13, wherein the transport pouch, during the transfer from the first into the second orientation, is rotated by an angle of 30-80 degrees, preferably 60-70 degrees, with respect to the conveying direction.

22. The method according to claim 13, wherein the transfer of the transport pouch from the first into the second orientation comprises rotating the carrying hook relative to the carrier.

* * * * *